Feb. 13, 1968
C. R. HUGHES
3,368,848
MINING MACHINE AND SHAKING CONVEYOR
COMBINATION AND THE CONVEYOR
Filed Oct. 3, 1962
5 Sheets-Sheet 3
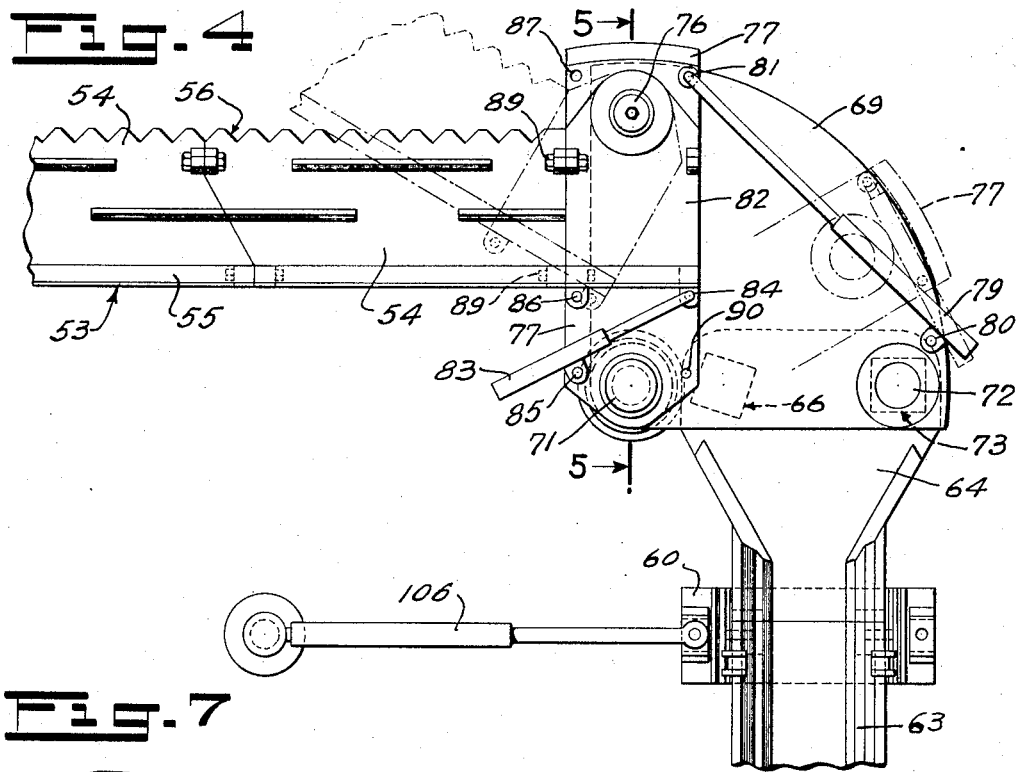
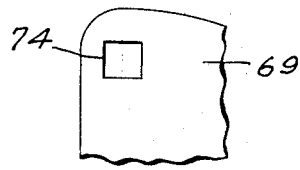
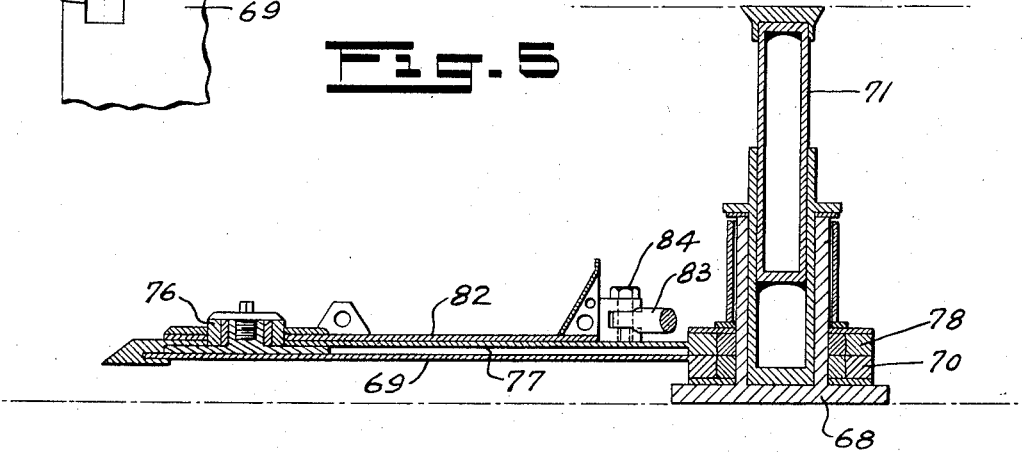
INVENTOR.
CHARLES R. HUGHES
BY
John M. Montstream
ATTORNEY

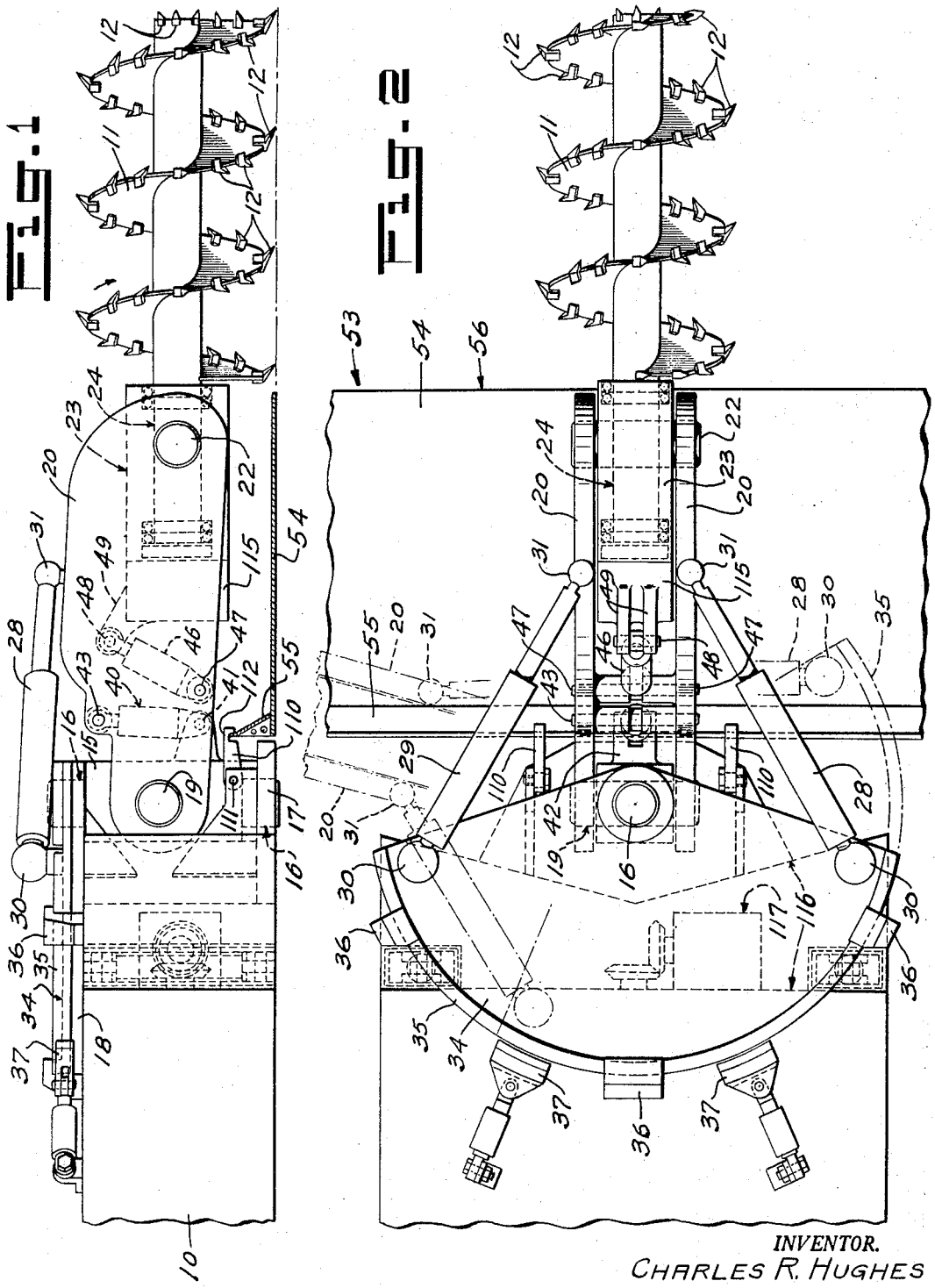

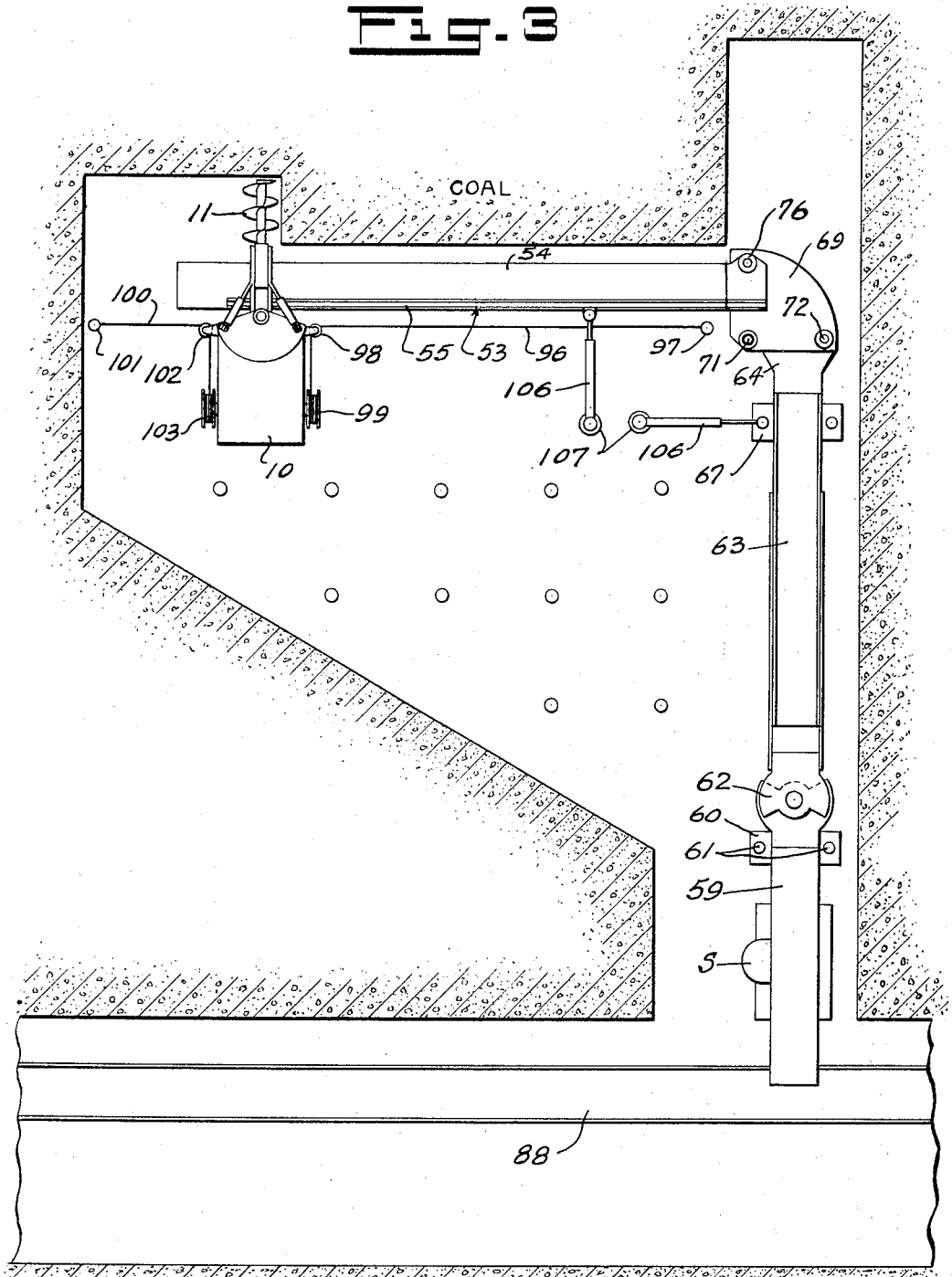

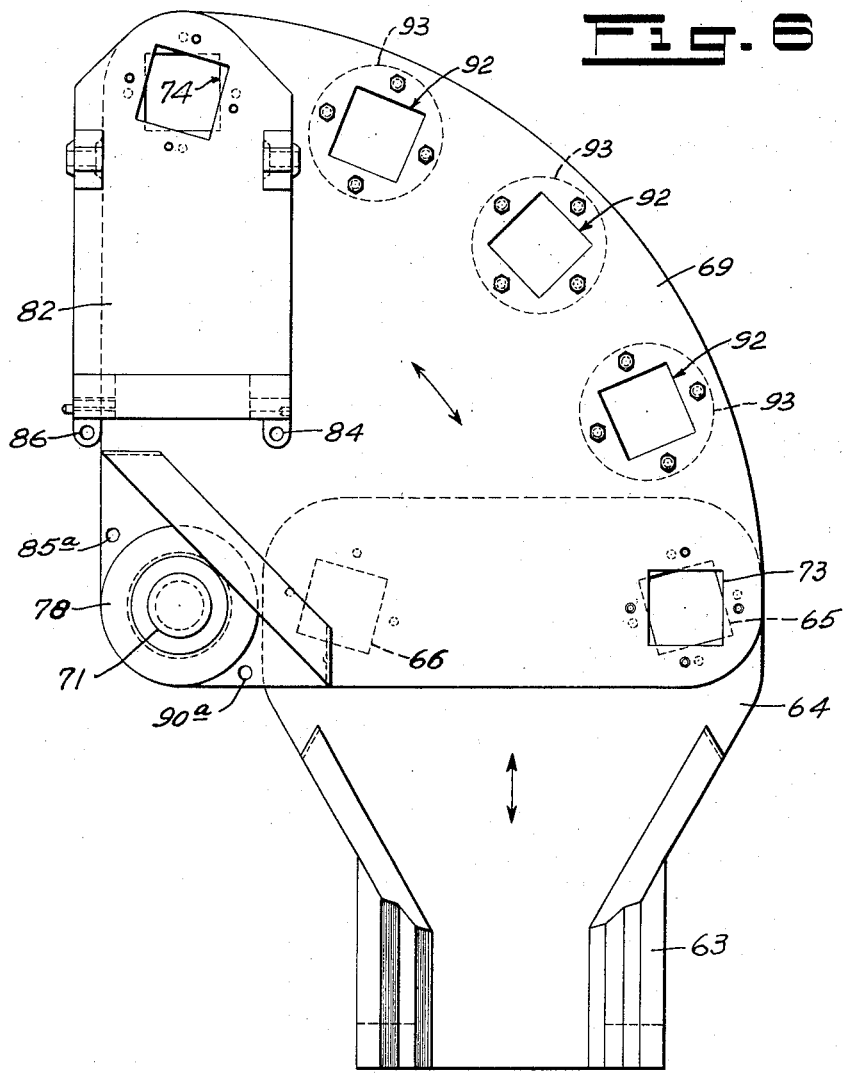

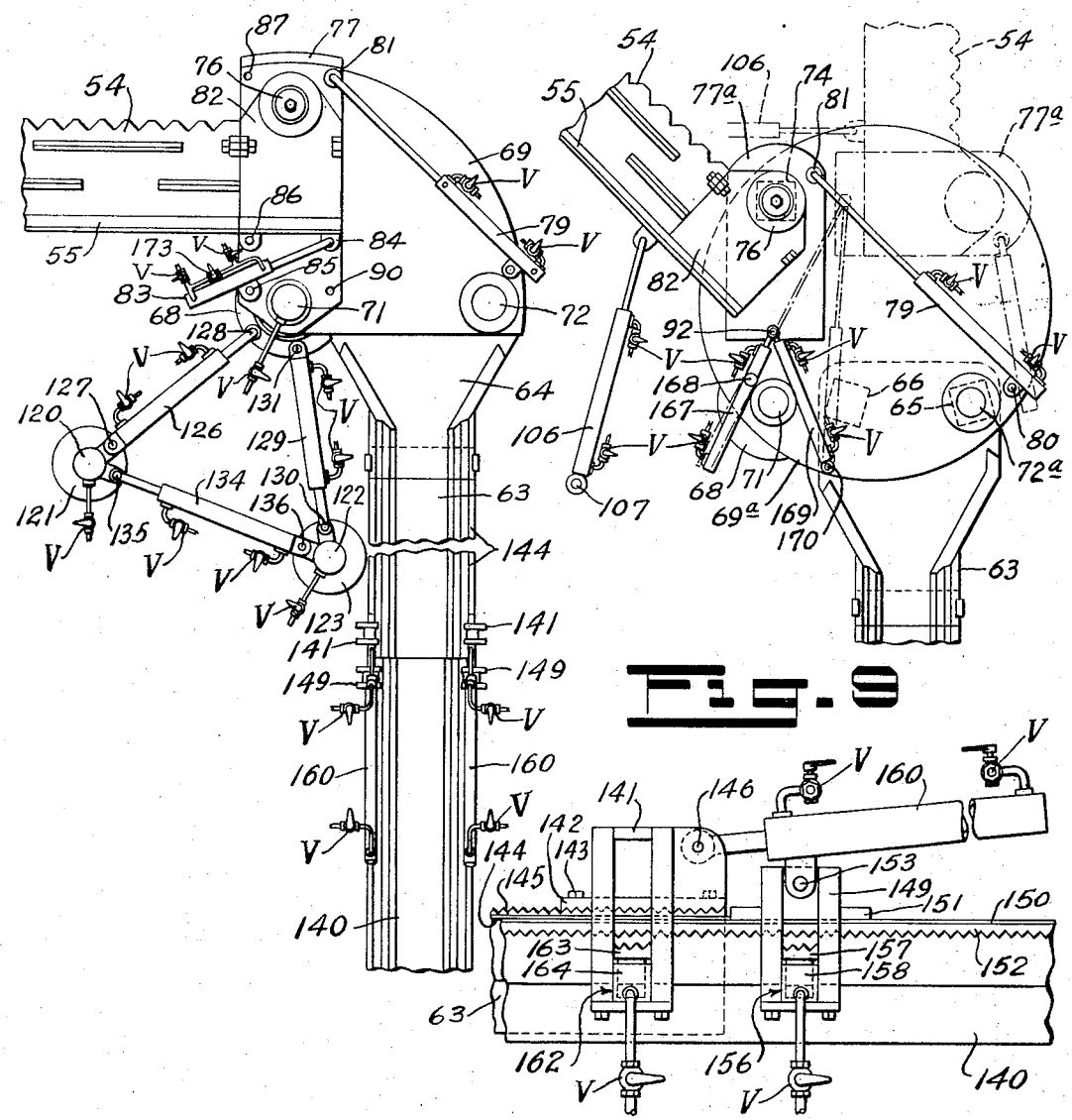

United States Patent Office 3,368,848
Patented Feb. 13, 1968

3,368,848
MINING MACHINE AND SHAKING CONVEYOR
COMBINATION AND THE CONVEYOR
Charles R. Hughes, Logan Township, Blair County, Pa.
(Buckhorn Road, Altoona, Pa. 16601)
Continuation-in-part of application Ser. No. 66,568,
Nov. 1, 1960. This application Oct. 3, 1962, Ser.
No. 229,264
42 Claims. (Cl. 299—43)

This application is a continuation-in-part of application Ser. No. 66,568, filed Nov. 1, 1960, now abandoned.

This invention relates to a combination of a coal mining machine and a shaking conveyor mechanism. The coal mining machine uses a screw means as a cutting element to break down coal from its solid state into fragments which coal is deposited on a shaking conveyor at the discharge or outby end of the screw means by the latter functioning as a screw conveyor. The shaking conveyor mechanism uses a sectional pan line conveyor with a face conveyor. The face conveyor may be adjusted and positioned at any angle through an arc of about 140 degrees with respect to the position of the screw means of the mining machine, the frame of the mining machine and/or the face of the working place to be attacked by the mining machine. The conveyor and mining machine are so constructed that the face conveyor is maintained in position at the discharge end of the mining machine screw means without interference between them while the screw means fragments the coal and the conveyor carries it away. The mining machine is constructed so that the screw means is movable at least vertically and it is desirable that it have tilting and swinging motion, whereby all coal in the coal measure may be removed between planes sufficiently spaced vertically to permit the advancement of the mining machine and conveyor into the excavated space on a substantially even or horizontal bottom plane. The vertical movement of the screw means permits the face conveyor to be easily moved or removed from the proximity of the mining machine when desired. With the screw means having swinging and tilting movement of about 150°, the prime mover may be positioned at right angles to or parallel with the face conveyor, either right or left, with the screw operating above the conveyor.

The invention also relates to the face conveyor of the shaking conveyor mechanism including its connection with the line conveyor which connecting means is constructed so that the face conveyor may be positioned with respect to the mining machine to receive loose coal directly from the screw means to carry the same away, at the same time permitting the screw means of the mining machine to cut and remove coal across the full width of the entire working face, reaching all corners and preparing the bottom of the working place for the advancement of the mining machine and conveyor to the proximity of the solid coal to be progressively mined and removed.

It is an object of the invention to construct a combination of a mining machine having screw means, which is a cutter and conveyor, with a shaking conveyor mechanism adjacent to the screw means so that the mining machine with its screw means may be moved laterally along the working face of the solid coal whereby a continuous cutting and conveying of coal is secured.

Another object of the invention is to construct a mining machine having a screw means with a mounting means so that a face conveyor of a shaking conveyor mechanism can be used therewith between the discharge end of the screw means and the prime mover and beneath the mounting means for the screw means.

A further object is as above and to provide a connection between the prime mover and the face conveyor.

Another object of the invention is to construct a shaking conveyor mechanism having a face conveyor which is particularly suited for use with a screw means for continuously feeding the coal to and along the conveyor mechanism as it is cut from the working face and also may be used efficiently and economically when blasting of the coal face is employed to fragment coal.

Another object of the invention is to construct a shaking conveyor mechanism having a line conveyor and a face conveyor extending at an angle thereto and at the end thereof and having a connection therebetween such that the face conveyor may be positioned or moved over a considerable arcuate range with respect to the line conveyor and which connection serves both as a conveying pan and a transfer of shaking motion from the line conveyor to the face conveyor.

Another object is to construct a shaking conveyor mechanism having a line conveyor and a face conveyor with a wide range of angular movement of the latter with respect to the line conveyor.

A still further object is to construct a shaking conveyor mechanism as above and in addition a new construction permitting the face conveyor to be mounted on either side of the line conveyor.

Another object is to construct a shaking conveyor having a face conveyor extending angularly at the end of the conveyor which face conveyor can be advanced or retracted or moved laterally with shaking oscillations continuing.

Other objects of the invention will be more apparent from the following description when taken in connection with the accompanying drawings illustrating a preferred embodiment thereof in which:

FIG. 1 is a side view of a portion of the coal mining machine with its screw means showing the mounting means therefor providing universal movement of the screw means;

FIG. 2 is a plan view of a portion of the mining machine;

FIG. 3 is a plan view of a mining chamber and the combination as it will be used;

FIG. 4 is a view of the conveyor mechanism and the connecting means between conveyors;

FIG. 5 is a section taken on line 5—5 of FIG. 4;

FIG. 6 is a modification of the connecting means between conveyors;

FIG. 7 is a partial view of the angle or corner pan of FIG. 4;

FIG. 8 is a top view of the inby or forward end of the shaking conveyor with hydraulic cylinders for moving the angle pan;

FIG. 9 is a side view of hydraulic cylinders and clamping means for advancing or retracting a pair of telescopic pans; and FIG. 10 is a plan view of another form of corner plan mechanism.

The mining machine includes any suitable prime mover 10 capable of moving forwardly and laterally on which may be mounted the screw means 11 for cutting and/or fragmenting the coal and conveying it to the discharge or inboard end thereof. This screw means is of relatively large diameter such as about one or two feet. It may have any desired length, preferably about three feet depending largely upon the power of the motor to drive the same, the thickness of the coal measure, and the friability of the coal to be cut. The screw means has cutting teeth 12 on its forward edge or edges and along the outer edges of the scroll to cut away the coal or material as the screw means is fed into the coal. In other words the screw means will be fed forwardly or endwise until it is in the solid coal for its full or a desired length, whereupon the prime mover and hence the screw means is moved laterally along the working face so that the periphery cuts the material loose and the screw means feeds or conveys it inwardly towards the prime mover onto a face conveyor at the outby or discharge end of the screw means.

The screw means shown has mounting means providing at least vertical movement and preferably tilting movement on a horizontal pivot and arcuate movement as well so that essentially universal movement is provided. As a consequence the screw means is more efficient and has greater flexibility. The raising and tilting of the screw means enables it to remove all coal in a seam thicker than the diameter of the screw. The mounting means shown includes a vertical pivot means carried on the prime mover and includes a vertical pivot member 15 of square section with bearing ends 16 rotatably mounted in spaced plates 17 and 18 of the frame. The vertical pivot means carries a horizontal pivot 19 on which is mounted a boom 20. The boom preferably is made up of a pair of spaced arms. At the outer end of the boom is a horizontal pivot 22 which mounts a bearing member 23. This bearing member rotatably mounts the shank 24 of the screw means and may also mount a motor for rotating the screw means. Any suitable motor may be used to rotate the screw means. The combination of the vertical movement of the boom and the tilting of the screw means bearing provides one way of securing parallel vertical movement of the screw means. The mounting means shown also enables the screw means to be tilted. The screw means is shown with one scroll although it may be two or more. The lowermost position of the screw means is at least level with the floor level of the prime mover but it is desirable that it be capable of going lower.

Motor means are provided to pivot the boom on the vertical pivot. This motor means includes a pair of fluid motors 28 and 29, one being shown on each side thereof and each includes a cylinder and a piston. As shown the cylinder is universally mounted on the frame or particularly on pivot plate 34 such as by a ball and socket joint 30 and the end of the piston rod is universally secured by a joint 31 to the boom or particularly one of the arms thereof. Each fluid motor extends at an angle with respect to the boom. By extending one piston and retracting the other, the boom and hence the screw means may be arcuately shifted on the vertical pivot through a relatively wide angle.

It is desirable to extend the range of arcuate movement of the screw means as well as the boom, and therefore the cylinders of the fluid motors are carried by a pivot plate 34 having an arcuate track 35 such as an arcuate periphery. This pivot plate is supported by a plurality of guides 36, three being shown spaced roughly about 60 degrees apart so that the plate is always supported by the guides, over its range of adjustment, by at least two of the supporting guides. Any suitable means may be used to lock the pivot plate in adjusted position, that shown being a pair of hydraulic clamps 37 carried by the frame or prime mover.

In order to widen the arcuate range of the screw means, the latter may be held stationary such as by contacting the floor of the mine chamber, releasing the clamps 37, and then energizing the boom fluid motors 28 and 29 such that the pivot plate is pivoted or adjusted in the guides to a new angular position such as shown in dot-dash lines. The clamps are then clamped on the pivot plate to anchor it in position. In this new position, the range of the screw means is applied at a different position so that its range has in effect been increased without changing the position of the prime mover.

Means are provided to raise and lower the boom on the horizontal boom pivot. The means shown is a fluid motor 40 located between the boom arms and having a fluid cylinder and a fluid piston. The hydraulic cylinder is pivotally secured to the vertical pivot means on a pivot pin 41 carried by projection 42 and the piston or piston rod is pivotally secured to the boom or a pin 43 carried thereby. Operation of a control valves means (not shown) controls the fluid to the motor means. The position of the boom may be raised or lowered as desired within its range and the range is such that the screw means will cut out to a height for the prime mover to be moved into the cut out area.

Means are also provided to tilt the screw means in a vertical plane on the horizontal bearing pivot 22. A fluid motor 46 may be used for this purpose which has a cylinder, piston and piston rod with the cylinder pivotly mounted on a horizontal pin 47 carried by the boom and preferably between the spaced arms thereof. The piston rod of this motor is pivotally mounted on a horizontal pin 48 carried between ears 49 forming a part of the bearing member 23 and spaced from the horizontal pivot 22 for the bearing member. Actuation of the fluid motor by valve means (not shown) will pivot the scew means on the horizontal pivot relatively to the boom so that it may be tilted or maintained in a horizontal position. The latter is the usual position since in this manner by raising and lowering the boom and maintaining the screw means horizontal, the solid coal may be cut between parallel planes at a considerably greater height than the diameter of the screw means. The mounting means provides a range of vertical movement for the screw means to bring the lower periphery of the latter at least to or somewhat below the floor level or the ground level of the mining machine.

It will be noted that the bearing 23 which rotatably mounts the screw means, and the boom 20 is mounted high enough or constructed to provide sufficient clearance between the inboard end of the screw means and the prime mover and under the mounting means for the boom so that a shaking face conveyor can be received thereunderneath without interference from the mounting means or the screw means bearing at their lower position.

The shaking conveyor mechanism (FIGS. 3–7) includes a face conveyor 53 which has a bottom 54 and rear or back wall 55 and a front edge 56. There is no forward wall or side to interfere with the feeding of coal directly from the inboard end of the screw means 11 onto the face conveyor or picking up coal upon forward advance of the face conveyor. The back wall of the face conveyor is free of any obstruction or mechanism of a permanent nature so that the prime mover may move along and adjacent to the rear wall of the face conveyor. The upper edge of the rear wall is of uniform width without obstructions so that the connector may slide along the same. The forward edge 56 of the face conveyor may have teeth (FIG. 4) to assist in feeding the forward edge of the conveyor into the broken coal cut or shattered by the screw means but which has not been conveyed by the latter onto the face conveyor. This face conveyor may be made up of telescoping or extension sections so that its length may be changed as desired that is if a longer or shorter extent of face of the coal is to be removed.

One end of the face conveyor is connected with a line conveyor as will be described. The line conveyor is in the main, of a known construction mounted in guideways or ball frames 60 which are anchored in position by jacks 61. The guideway 67 for the pivotal forward end portion 63 may be similarly anchored, however, other means are provided therefor, as will appear hereinafter. The conveyor is movable longitudinally in the guideways so that the line conveyor may be shaken longitudinally by a shaking mechanism. Preferably the line conveyor has a swivel pan section 62 so that the forward end portion 63 thereof may be angularly positioned as desired and as permitted by roof supports. It is advantageous for the line conveyor to have a telescoping extensible section or sections fore and aft of the swivel pan section 62. The extensible section or sections in the forward end portion enables the forward end and the face conveyor to be advanced as the coal is cut away and for other purposes as will appear. The end of the line conveyor is made substantially wider to catch and funnel coal onto the pan line and at each side edge thereof is a pivot socket 65 and 66.

The line conveyor is coupled to the face conveyor by a connecting means which serves as a conveyor for the coal moving along the face conveyor onto the connecting means and then onto the end of the line conveyor. The connecting means also serves as the shaking linkage to transmit the shaking motion of one conveyor to the other or as shown to transmit the shaking of the line conveyor to the face conveyor. This connecting means is constructed to enable the face conveyor to be pivoted relatively to the line conveyor such as by a fluid motor.

The connecting means of FIGS. 3–5 includes a corner or angle pan 69, shown as approximately a quadrant of a circle with the radial sides of the quadrant substantially greater than the width of the ends of the conveyors. The corner pan has pivot means including a pivot bearing 70 at or adjacent the apex of the radial sides of the quadrant which pivot bearing is mounted on a pan pivot 68, forming a part of the pan pivot means. The pan pivot is located on one side of the line conveyor beyond but adjacent to the side end edge thereof. This pan pivot is secured or anchored in place by a removable jack 71, which may be sockets in the pan pivot and shown particularly as a part of the pan pivot structure. The pan pivot is anchored between the roof and the floor of the chamber and hence is an anchored or fixed pivot when the conveyor is operating. At one corner of the corner pan is a line conveyor pivot means 72 which pivotally attaches the line conveyor to the corner pan with the corner pan above the line conveyor. The pivot means as shown is disconnectable from both the conveyor and corner pan and is received in a pivot socket 73 and 65 (FIG. 6) carried by each part. For reasons which will appear the pivot bearing in the end of the line conveyor is at the far side thereof with respect to the pivot 68 for the corner pan and another pivot socket 66 is provided at the near side, the purpose of which will appear hereinafter. The longitudinal shaking of the line conveyor, therefore, pivotally oscillates the corner pan about the pivot 68. The corner pan has a pivot socket 74 (FIG. 7) at its other corner for a purpose which will be explained later. The corner pan and its pivot constitute corner pan means.

The face conveyor is pivotally mounted with its discharge end over the corner or angle pan by a face conveyor pivot 76. This face conveyor pivot is carried by a pivot arm 77 which has a pivot bearing 78 pivotally mounted on the pan pivot 68. Preferably the face conveyor pivot 76 is carried by an end member 82 which is suitably secured to the end of the face conveyor 54 by bolts 89 and forms a part thereof. Power means may be provided to swing the arm 77, that shown being a fluid motor 79 which has one end pivotally mounted on the corner pan 69 by a pivot 80 and the other end is pivotally secured to the arm 77 by a pivot 81. Oscillation of the corner pan is transmitted to the face conveyor for longitudinally shaking thereof through the motor and its connections. The motor may be close to the corner pan so that it also serves as a wall for the corner pan. A motor 83 may be connected between the face conveyor and the pivot arm 77 by a pivot 84 carried by the face conveyor or end member 82 which pivot is spaced from the face conveyor pivot 76 and by a pivot 85 on the pivot arm 77 to swing the face conveyor on the pivot 76. The face conveyor motor 83 may be connected between a pivot or pivot socket 90 carried on the other side of the pivot arm 77 and a pivot or pivot socket 86 when the face conveyor is mounted in the other direction as will be described. Material such as coal moving longitudinally along the face conveyor is deposited on the oscillating corner pan where it moves along or around this pan onto the end of the line conveyor and conveyed to the delivery end of the latter. Here some other conveyor, such as a belt conveyor 88 or cars, may be located to receive the coal therefrom. The motor 79 may be attached interchangeably to a pivot socket 87 for a greater extent of pivotal movement of pivot arm 77. If this pivot socket is to be used the motor 79 must be spaced above the corner pan 69 so that the parts 77 and 82 may pass between the motor and the corner pan.

It will be observed that this connecting means or coupling pivotally mounts the face conveyor, adjusts the position of the face conveyor, serves as means for transmitting the longitudinal shaking of the line conveyor to the face conveyor for its longitudinal shaking and forms a part of the conveying system in that the coal moves thereover from the end of the face conveyor to the adjacent end of the line conveyor. The double pivot for the outby or discharge end of the face conveyor gives it a very wide range of pivotal movement. This connecting means is practically on the floor which enables the face conveyor to be on the chamber floor or ground at one end and just above the floor level or as low as possible at the connecting means so that it does not interfere with movement of the mounting means for the screw means and the screw means above the face conveyor.

The pivotal arm 77 provides adjustable means as a part of the connecting means for the face conveyor so that the latter has a wide range of angular adjustment relatively to the corner pan and the line conveyor. Two forms of adjusting means are shown that using the pivotal arm 77 and motor 79 as described and the other may be attached at various positions relatively to the corner pan. Pivoting of the arm 77 over the corner pan enables the face conveyor to be pivoted through roughly 60° which added to the pivoting of the face conveyor pivot 76 gives it a range of adjustment of about 120° on either side. Pivoting of the forward section of the line conveyor on the swivel through section 62 adds a further angular adjustment of about 60° for a total of about 180°.

The other form of adjusting means, shown in FIG. 6, provides a series of holes or sockets 92 along the arcuate side of the corner pan in which the pivot means 76 for the face conveyor may be secured. Sockets not in use may be covered in any suitable manner such as by covers 93 if necessary. It will be noted then that the adjusting means for the face conveyor may be sockets carried by the corner pan or an arm mounted on the pan pivot.

For increased utilization, it is desirable for the face conveyor to be able to extend in the opposite direction with respect to the line conveyor from that shown which is achieved by shifting the corner pan pivot means 68 to the opposite side of the end of line conveyor and attaching the line conveyor pivot 72 in the pivot socket 66 on the opposite side thereof and in socket 74 in the corner pan. For the construction of FIG. 6 the pivot socket 73 provides a point of attachment for the face conveyor pivot 76 with the face conveyor extending in the opposite direction from the opposite side of the end member 82. Pivots 85a and 90a carried by the corner pan 69 adjacent to the pivot 70 for the pan provides for attachment of the motor 83 when the face conveyor extends to the left or right.

For the adjustable means of FIGS. 4 and 5 having a pivotal arm 77, the same shift is made of the angle or corner pan pivot 70 and the line conveyor pivot 72 is attached in the other socket 74 of the corner pan. The pivot arm 77 is swung to the other radial edge of the corner pan and the face conveyor attached to the other side of the end member 82.

FIG. 3 shows a layout of the manner in which the mining machine 10 and the shaking conveyor mechanism function together in a mining chamber. The mining machine is shown with the screw means having cut away a portion from the solid coal at the left hand end in the manner described by forward movement of the mining machine such as with ropes or cables and resetting the jacks to which they are attached. The lateral movement of the mining machine may be achieved by a cable 96 anchored at one end to a jack 97 which cable passes around a pulley 98 carried on one side of the prime mover or mining machine and then around a winding drum 99. A similar cable 100 on the opposite side is secured to a jack 101 which cables passes around a pulley 102 carried on the other side of the mining machine and then passes around another winding drum 103. Each drum is driven independently of the other, however, by rotating the drums, the cable on one side may be unwound and cable on the drum on the right side wound up to pull the mining machine with the screw means laterally along the face of the solid coal. The coal cut away is conveyed inwardly by the screw means and delivered onto the face conveyor where it is fed to the line conveyor as described.

In using the mining machine and conveyor mechanism combination it is desirable first to remove the coal and form an initial passageway directly ahead of the line conveyor for the depth of one cut by feeding the mining machine forwardly at this point. The line conveyor with the face conveyor removed can remove the coal from the passage using the end thereof or the face conveyor can be swung or positioned to form a continuation of the line conveyor. More efficient operation can be obtained through the combined operation of mining machine and conveyor mining a maximum quantity of coal with a minimum of conveyor movement. A suggested method is to mine out a roadhead (FIG. 3) directly before the direction in which the room conveyor will be extended. To do this the face conveyor is swung in an arc about its several pivot points until it is against or near the right hand rib of the room and in a direction approximating the center line of the room conveyor. While the face conveyor is in this position, the combined mining machine fragmentation of coal and the gathering action of the conveyor can be accomplished over the end of the face conveyor until a relatively deep roadhead has been excavated in the face of the room. Having provided a roadhead, the face conveyor is then positioned along the working face and parallel to it after which a multiplicity of lateral cuts across the working face can be made before another extensive move of the face conveyor is required.

A face conveyor connector 110 (FIGS. 1 and 2) between the mining machine and the face conveyor may be used to hold the face conveyor in fixed relation to the mining machine and so that the latter may be moved towards and away from the coal face with the movement of the mining machine. This connector is pivoted on a pivot 111 carried by the frame of the mining machine and is notched at 112 which receives the edge of the rear wall 55 of the face conveyor thus permitting the face conveyor to slide longitudinally through the notch and at the same time preventing the face conveyor from moving towards or away from the screw. The face conveyor moves forwardly as the screw means bores forwardly into the coal face and picks up the coal that has been removed. The screw means is moved vertically for the height of the coal face or measure and to provide an eventual cut high enough so that the mining machine may be advanced later into the cut out area along the entire face. With the screw means into the coal body for its full length, the screw means is operated vertically and the mining machine is pulled or moved laterally to cut away the coal for the full lateral width and depth of the chamber to the initial passageway. Alternately the mining machine may be moved laterally for the length of the face with the screw means in one elevation and thereafter another or additional lateral cuts made. This operation is repeated until the coal has been removed to the depth of the initial cut on the right. Any loose coal remaining in the cut out area may be picked up by raising the screw means above the face conveyor and advancing the same laterally and by extending the line conveyor. The operation is then repeated for another lateral cut.

With the swivel 62 in the line conveyor it is not necessary that the face conveyor have a length comparable to the lateral width of the chamber since the swivel connection enables the swiveling portion of the line conveyor to be shifted to left and right about 30 degrees on each side of the pan line to shift the face conveyor over a wide range. As the coal is cut away towards the line conveyor the swivel in the line conveyor enables the end thereof to be shifted to the right as the cut approaches the line conveyor so that the mining machine may be brought relatively close to the right hand rib or wall of the chamber and remove the coal across the entire face to the initial roadhead or passageway if provided. If the initial roadhead has not been provided then the swinging of the screw means on its vertical pivot enables the screw means to reach to the right hand wall of the chamber. The swiveling of the end of the line conveyor is accomplished by a fluid motor 106 anchored at one end by the jack 107 and the other end being attached to the swiveled end or portion of the line conveyor such as guideway 67. This motor anchors the swiveled portion in adjusted position.

When it is desired to cut a lateral passage from the left hand wall of the chamber to excavate a cross cut or a breakthrough from one mine room to another, this can be done by adding an extension to the end of the face conveyor and loading over the end of the end of the face conveyor which does not have a backboard, for removing the coal which has been shattered by blasting or removed by the mining machine.

The conveyor mechanism may be used also when blasting the coal face. The face conveyor is located parallel to and fairly close to the coal face to receive the coal shattered from the face by blasting. As the face conveyor, through its operation carries away the loose coal that is upon it, the face conveyor is forced laterally under the pile of loose coal blasted free by the motor 83, or by a motor 106, attached thereto at one end and the other end anchored by a jack 107, pushing laterally upon it, advanced into the shattered coal by angular and forward manipulation to carry away the coal. The operation is then repeated.

The screw means may be rotated in any suitable fashion such as by a rotary fluid motor 115 carried by the bearing member 23 and connected with the shank 24 of the screw means by gears. To supply fluid pressure to the various motors, a fluid tank 116 may be provided on the mining machine and a fluid pump 117 driven by the mining machine power plant provides the fluid pressure. Hose connections are made between the pump 117 and other motors or cylinders.

In the constructions of corner pan means of FIGS. 4, 6 and 8, means are provided for securing two results namely pivotally mounting the end of the face conveyor over the corner pan and operatively connecting the end of the face conveyor with the corner pan for transmittal of shaking oscillations from the line conveyor or corner pan to the face conveyor. In the construction of FIG. 6 with the face conveyor pivot carried by the corner pan, this pivot serves both functions. In the constructions of FIGS. 4 and 8, the operating connection between the face conveyor and the corner pan is secured by a separate element in the motor means 79.

It is very desirable to be able to continuously advance or shift the position of the face conveyor with the shaking of the entire conveyor continuing. The face conveyor is more easily advanced into the shattered coal and no loading and conveying time is lost. FIGURES 8 and 9 illustrate conveyor mechanism or a combination by which this result can be achieved. This pivot shifting mechanism for the fixed pivot 68 of the angle or corner pan 69 enables the pivot and corner or angle pan to be shifted or moved while being supported during the movement so that shaking oscillations of the corner pan and the entire conveyor will continue. This pivot shifting mechanism includes a jack 120 having a base 121. A second jack 122 is spaced from the first jack and has a base 123. These two jacks preferably are hydraulic jacks as illustrated and each jack is controlled by its own valve means V.

A power means 126 is connected at one end to a pivot 127 carried by the jack 120 and conveniently carried by the base 121. The other end of this power means is connected or attached by a pivot 128 carried by the pan pivot 68 and particularly shown as carried by the base of this pivot. A second power means 129 extends between the jack 122 and the pan pivot 68, one end thereof being attached or connected with a pivot 130 carried by the jack 122 and the other end being connected or attached by a pivot 131 carried by the pan pivot 68. The pivots 128 and 131 are preferably spaced from each other. The two power means are preferably hydraulic cylinders or power means each controlled by its own valve or valves V.

With the two power means particularly described, the pan pivot 68 can be shifted or advanced without need to halt the shaking mechanism and with the shaking oscillations being continuously transmitted through the corner pan 69 to the face conveyor 54. This is accomplished by releasing the pan pivot jack 71 and by virtue of the jacks 120 and 122 fixed in position and the power means 126 and 129, the pan pivot 68 is held or supported without being influenced by the continued shaking of the shaking conveyor even though the jack 71 has been released. By extending the power means 129 alone the position of the pan pivot 68 is shifted in an arch from the pivot 127. Similarly extension of the power means 126 alone will shift the position of the pan pivot 68 on an arc from the pivot 130. Again extension of both power means 126 and 129, will shift the position of the pan pivot 68 forwardly or away from the fixed jacks 120 and 122 while being held or supported by the two power means and their jacks against any influence from the shaking of the line conveyor, corner pan and face conveyor. When the pan pivot 68 has been shifted or advanced to the full extent of the power means, the pan pivot jack 71 is energized to anchor the pan pivot in this advanced position by the jack engaging the roof of the mine. The shaking through the corner pan continues.

The pan pivot 68 may be further advanced or shifted by proceeding in the following manner. With the jack 71 anchored between the top and bottom of the mine chamber, the jacks 120 and 122 are released. Then by contracting the power means 126 and 129, the jacks are moved forward or towards pivot 68 by this contraction. The position of the jacks 120 and 122 may be manually adjusted as to spacing as desired. When the power means have been fully contracted the jacks 120 and 122 are energized to fix their position whereupon the pan pivot jack 71 may be released and free for shifting and the pan pivot 68 may again be advanced with the pan pivot being held or supported during the advance by the jacks 121 and 122 and the power means 126 and 129 for continuous shaking of the whole conveyor. Lateral shifting or movement is secured by extension of one power means only.

Shifting of the position of the pan pivot 68 is more conveniently achieved if the jacks 120 and 122 are retained in spaced relation which may be accomplished by a suitable connecting means. This connecting means 134 has one end pivotally connected by a pivot 135 to the jack 120 carried by the base 121 and the other end is pivotally attached by a pivot 137 to the jack 122 shown as carried by the base 123. With this construction the two jacks 120 and 122 maintain their spacing when the power means are contracted. The maximum of convenience and efficiency is secured if the connecting means 134 is a third power means as particularly illustrated. This connecting means or third power means will always maintain the jacks 120 and 122 in spaced relation depending upon the length of the connecting means. With such third power means, the spacing and maneuvering of the position of the jacks 71, 120 and 121 may be widely controlled. This third power means is conveniently an hydraulic cylinder or power means and controlled by its own valve V.

When the pan pivot 68 is advanced for any substantial distance, it is necessary that the line conveyor pivot means 72 also be advanced with the pan pivot 68. It is customary to use telescoping pans in a shaking line conveyor which pans are clamped together and extended when needed. In order, however, for a telescoping pan to be advanced without requiring stopping of the shaking mechanism, the extension or advance of a telescoping pan with respect to its cooperating pan must be accomplished through a pan connecting means which also transmits shaking oscillations therethrough. A mechanism which accomplishes this is illustrated in FIG. 9 in which the telescoping pan 63 is received within a cooperating pan or pan section 140. The telescoping pan 63 is shown as the last pan in the line conveyor and hence carries the conveyor pivot 72. This telescoping pan carries at its rear or outby end, a first bracket means 141. The bracket means shown includes a bracket on each side of the telescopic pan for smoothness of operation. Each first bracket carries an attaching plate 142 for securing the same, such as by screws 143, to the top surface of a flange 144 extending outwardly from each top edge of the pan. A more secure attachment is achieved by the flange carrying on its upper surface a serrated rack 145 and the attaching plate 142 having serrations meshing therewith. Each bracket carries a pivot 146.

For a conveyor power means which is shorter than the full length of the telescoping pan, a second bracket means, shown as a pair of second brackets 149, is movably or adjustably attached to each outwardly extending flange 150 of the cooperating pan 140. Each bracket includes a slide plate 151. A serrated rack 152 is suitably secured to the lower surface of each flange throughout the length thereof. Each second bracket carries a pivot 153.

Clamping means 156 of any suitable construction is provided to lock each second bracket to its flange of the cooperating pan. Preferably an hydraulic power means or cylinder 158 is used as a clamping means and it has a clamping jaw 157 with serrations to intermesh with the serrated rack 152. The clamping and release of the power means 158 is achieved through a suitable valve V.

Pan power means of suitable construction is connected between the two brackets, that shown being a hydraulic power means or cylinder 160. One end of the power means, such as the piston rod, is pivotally attached to the pivot 146 and the other part of the power means or cylinder is attached to the pivot 153. The attachment shown is at the forward end of the cylinder. This power means 160 is controlled by suitable valve means V. A single valve for the ends of the two power means may control both of the latter.

With the clamping jaw 157 engaging the rack 152, each bracket 149 is anchored to the cooperating pan at or adjacent to the end of the telescoping pan 63. With clamp 163 released, extension of the power means 160 advances the telescoping pan 63 and thereby advances the line conveyor pivot 72. The power means 160 should be advanced approximately at the same rate or distance as the advance of the pan pivot 68 as previously described. Without more the telescoping pan can be advanced to the full extension of the power means 160. While advancing the telescoping pan, shaking motion continues to be transferred from one pan to the next pan from the bracket 149, which is clamped in position, through the motor means to the bracket 141 which is secured to pan 63. With a power means of a length comparable to the telescoping pan, the bracket 149 may be permanently secured to the outby or far end of the cooperating pan.

For a relatively short power means 160 with respect to the pan length, in order to continue the advance of the telescoping pan for its full extension clamping means 162 are provided to secure the two pans together so that oscillation may continue during contraction of the power means to move the bracket means 149 forwardly so that they will again be adjacent to the end of the telescoping pan. This bracket means 149 is then again clamped to the cooperating pan and a second advance may be utilized. It is convenient that the pan clamping means 162 be associated with the first bracket 141. This pan clamping means includes a serrated clamping jaw 163 and it is moved into clamping relation with the rack 152 by suitable means, that illustrated including a hydraulic cylinder 164. This cylinder is controlled by a suitable valve V.

In order to advance the telescoping pan 63 beyond the first full advance of the power means 160, the clamping jaw 163 is clamped against the serrated rack 152 and the two pans are clamped together thereby so that shaking of the line conveyor continues to be transmitted between the two pans. The clamping jaw 157 for each second bracket 149 is released so that the second bracket means is movable. The power means 160 is then contracted which shifts the second bracket means 149 forwardly to bring the same against or adjacent to the end of the telescoping pan 63. The clamping means 156 is then operated to clamp each second bracket in its advanced position. The pan clamping means 163 is then released and the oscillations continue without interruption between the first and second bracket means through the pan power means 160. The power means is then ready to further advance the telescopic pan 63 and the pan pivot 72 with shaking oscillations continuing throughout without interruption. This operation may continue for the full range of extension of the telescoping pan. It may be desirable to provide an additional set of pan clamping means 162 spaced forwardly from the first bracket means when the overlap between the two pans is large. When the telescoping pan 63 has been advanced to the limit of its extendability, a similar telescoping unit elsewhere in the line conveyor may be resorted to for additional extension of the line conveyor. Such sections may be rearward or outby of the swivel 62 in a line conveyor in which event the swivel is advanced which is desirable since with the swivel relatively close to the face conveyor, say by one pair of telescoping pan, greater maneuverability of the face conveyor is secured without likelihood of interference from roof jacks. As an alternative, the shaking mechanism may be stopped and a new pan section inserted between the cooperating pan 140 and its next following pan section in known manner or the new section inserted anywhere in the line conveyor.

A motor piston is forced in one direction by opening the valve to the source of fluid pressure. As long as the valve at the other end of the cylinder remains closed, the piston does not move but when this valve is opened to exhaust or fluid return position, the piston of the cylinder retreats away from the pressure at a speed which is controllable by the extent to which the exhaust is opened. The capacity of the fluid pump to supply fluid or oil to a cylinder is greater than the capacity of the return valve so that a cylinder will not run out of oil. The thrust of the oscillating telescopic pans and cylinder 79 on the angle pan will be under counter pressures when a valve is opened, however, it could have no effect upon the piston unless the total thrust pressure should exceed the total fluid pump pressure within a cylinder.

The hydraulic cylinders or motors are double acting for power pressure in both directions. The valves V are of known type and all may be mounted adjacent to one another and connected with its power means by a flexible hose. The several jacks are released by exhausting the fluid from its cylinder sufficiently to retract the piston from clamping contact.

In the broader aspect of the combination the face conveyor may be a secondary conveyor having side walls rather than the specific face conveyor. In the broader aspect of the corner pan construction, it is immaterial whether the secondary or face conveyor is connected with the arm and the line conveyor with the corner pan or the line conveyor is connected with the arm 77 and the face conveyor is connected with corner pan 69, that is a reversal of the connections or a reversal of the conveyor that is the secondary conveyor becomes the line conveyor and the line conveyor becomes the secondary conveyor. In the connection particularly illustrated adjustment of the position of the face conveyor is secured by pivotal movement of the arm and in the reverse connection adjustment of the position of the face conveyor is secured by pivotal adjustment of the corner pan. Again, if it should be desired in such reversal of parts, the corner pan and arm position on the pivot 68 may be reversed in assembly to place the arm 77 and hence the end of the line conveyor below the corner pan. Likewise in the construction of FIG. 6, secondary or face conveyor may remain as shown and the line conveyor may be selectively connected with one of the adjustment sockets 92 in the corner pan to secure adjustment of the relative positions between line conveyor and secondary conveyor.

FIG. 10 illustrates a form of construction of corner pan similar to that illustrated in FIG. 4 but differs therefrom in that the pivot arm 77 carrying the conveyor pivot 76 for the secondary or face conveyor need not be mounted on a pivot carried by the corner pan means or as illustrated particularly in FIG. 4, on the corner pan pivot 68. In the construction of FIG. 10, the pivot arm 77a carries the pivot 76 for the secondary conveyor. This pivot arm carries a pivot 92 to which is connected a pair of power means shown as fluid cylinders. One power means 167 has the cylinder pivotally attached to the corner pan 69a on a pivot 168 and a second power means 169 has its cylinder pivotally attached to the corner pan on a pivot 170. The pivot arm 77a is free to be positioned anywhere over the corner pan by the pair of power means 167, 169 and the power means 79. Shaking vibrations from the line conveyor 63 is transmitted to the secondary conveyor through the power means 79 and shaking is not interrupted during any extension or contraction of the power means 79 and power means 167 and/or 169.

Maintaining the pivot 92 in the position illustrated, the secondary conveyor pivot 76 may be shifted over the corner pan by contraction or extension of the power means 79, the pivot arm 77a pivoting about the pivot 92 which is held stationary by the pair of power means. As an illustration, the power means 79 may be contracted its full length and the pair of power cylinders 167 and 169 may be extended their full length to position the pivot 76 in the position shown in dot dash lines. The construction illustrated in FIG. 10, in effect, has two pivots for the pivot arm 77a. For example with the power means 79 in the position shown in dot dash lines, contraction of the cylinders 167 and 169 will shift the pivot arm 77a on the pivot 81. The power means 106 may be used to pivot the secondary or face conveyor 54 on its pivot 76. Of course in order for the power means 106 to operate in the position shown in dot dash lines, the roof jack 107 will be released and shifted to a new adjacent position. By selecting power means of the proper maximum extension, the secondary conveyor pivot 76 can be shifted to positions over the corner pan solely.

With the particular connection illustrated for the connection of the power means 83 with the secondary conveyor 54, 82, it is desirable to release the locking effect of this power means after circular adjustment of the secondary conveyor has been made. This release of power means 83 may be accomplished through a by-pass 173 connecting the ends of the cylinder of the power means which by-pass valve is closed when the power means is energized to shift the angular position of the secondary conveyor on its pivot 76 and after the shift has been made the by-pass valve is opened. The secondary conveyor is then subject to longitudinal shaking motions from the corner pan and power means 79. If desired the secondary conveyor may be backed up by a jack or the like to assure that this conveyor does not change its position during shaking.

In the constructions particularly illustrated, the range of operable angular positions of the secondary conveyor is about 30° on each side of a line through pivot axis 76 normal to a line through pivot axes 71 and 76. The secondary pivot has a range of operable angular positions to a maximum of about 90° from a line through pivot axes 68, 72 which range may be decreased or increased, dependent upon the dimensions of the corner pan 69.

This invention is presented to fill a need for improvements in a mining machine and shaking conveyor combination and the conveyor. It is understood that various modifications in the structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A combination of a mining machine for material such as coal and a shaking conveyor mechanism comprising a prime mover, a screw means of substantial diameter and length, the screw means having a periphery and an inboard end and an outer end, cutters on the outer end and periphery of the screw means to cut the material, the screw means conveying the material to the inboard end, bearing means having an axis and mounting the screw means for rotation, mounting means mounting the bearing means and screw means on the prime mover for at least vertical movement, the screw means having a radius substantially greater than the dimension of the bearing means from its axis to its lower surface to provide substantial clearance space underneath the bearing means at its lower position, the mounting means being spaced a substantial distance above the ground level when the screw means is at its lower position and forming a substantial clearance space; shaking conveyor mechanism including a line conveyor and a face conveyor the latter being received in the clearance space, the face conveyor having a bottom and a front edge and a back wall, the back wall of the face conveyor being free of any obstructions, connecting means connecting the end of the line conveyor and the adjacent end of the face conveyor including a corner pan having a pan pivot on one side of the line conveyor, a line conveyor pivot connecting the line conveyor and the corner pan spaced a substantial distance from the pan pivot, and means pivotally mounting the end of the face conveyor with its discharge end over the corner pan and connecting the corner pan and the face conveyor at a point spaced a substantial distance from the pan pivot for shaking the face conveyor; and shaking means connected with the line conveyor to shake the latter and the face conveyor longitudinally.

2. A combination as in claim 1 including means carried by the mounting means and slidably engaging the face conveyor to maintain the latter in position with respect to the prime mover.

3. A combination as in claim 1 in which the mounting means includes vertical pivot means carried by the prime mover, a horizontal boom pivot means carried by the vertical pivot means, a boom mounted on the boom pivot means, a horizontal bearing pivot carried by the boom spaced from the horizontal boom pivot means on which the bearing means for the screw means is mounted, motor means connected between the boom and the bearing means to tilt the latter and the screw means, motor means connected between the vertical pivot means and the boom to pivot the latter vertically, and motor means connected with the boom to pivot the latter on the vertical pivot means.

4. A combination as in claim 1 in which the line conveyor pivot means includes a pivot socket in the end of the line conveyor on one side thereof, and a second line conveyor pivot socket in the end of the line conveyor on the opposite side from the aforesaid pivot socket.

5. A combination as in claim 1 in which the means for pivotally mounting the face conveyor is an adjustable pivot means for angularly adjusting the face conveyor relatively to the corner pan.

6. A combination as in claim 5 including a plurality of pivot sockets carried by the corner pan and angularly spaced from each other with respect to the fixed corner pan pivot.

7. The combination as in claim 6 in which the line conveyor pivot socket includes a pivot socket on one side of the end of the line conveyor, a second socket on the other side of the end of the line conveyor, a second socket on the other side of the end of the line conveyor, and the pivot sockets in the corner pan being spaced radially from the fixed pivot means.

8. A combination as in claim 5 in which the adjustment pivot means includes a pivot arm pivotally mounted on the anchorable pivot for the corner pan, the face conveyor pivot means being mounted on the pivot arm, and means connecting the corner pan and the pivot arm to adjust the same and to transfer shaking motion between the corner pan and face conveyor, the power means being connected at a pivot and face conveyor, the power means being connected at a point spaced from the corner pan pivot.

9. A combination as in claim 8 in which the line conveyor pivot means includes a pivot socket on one side of the end of the line conveyor, and including a second pivot socket on the other side of the end of the line conveyor, and a second corner pan socket at the other end of the corner pan.

10. In a mining machine of the short-wall type for use with a transverse shaking conveyor and capable of being moved in any direction by powered cables, the combination comprising, a prime mover, vertical pivot means mounted on said prime mover, horizontal pivot means mounted on said vertical pivot means, a boom, the outby end of which is mounted for arcuate movement on said horizontal pivot means, first fluid power means connected with the boom and the vertical pivot means for swinging the boom in a vertical plane, second fluid power means connected with the boom and the prime mover swinging the boom in a horizontal plane, a horizontal shaft mounted at the inby end of the boom remote from the prime mover, a rotatable cutting element mounted on said horizontal shaft, power means for driving the cutting element, bearing, third fluid power means connected with said cutting element and said boom for tilting said cutting element in a vertical plane about said horizontal shaft, the boom and cutting element being so mounted on the prime mover so as to provide sufficient space therebeneath to permit the free operation of said transverse shaking conveyor.

11. The combination set forth in claim 10 wherein the second fluid power means is pivotally attached to the boom at one end and pivotally attached to a rotatable plate pivotally mounted on the prime mover for rotation of the plate in a substantially horizontal plane substantially parallel to the base of the prime mover.

12. A shaking conveyor mechanism comprising a secondary conveyor having a bottom, longitudinal edges and a connecting end; a line conveyor having a forward end; corner pan means providing a conveying connection between the secondary conveyor and the line conveyor including a corner pan and an anchorable pan pivot carried by the corner pan and having a vertical axis; a jack carried by the anchorable pan pivot to anchor the pan pivot between floor and roof and having a vertical axis of motion in line with the pan pivot axis, line conveyor pivot means pivotally mounting the end of the line conveyor to the corner pan at a point spaced from the anchorable pan pivot, means operatively connecting the end of the secondary conveyor with the corner pan means for shaking the secondary conveyor from the corner pan and pivotally the end of the secondary conveyor including a secondary conveyor pivot means carried by the connecting end of the secondary conveyor and carried by the corner pan means at a point spaced from the anchorable pan pivot, the end of the secondary conveyor substantially overlapping the corner pan for substantial angular adjustment of the secondary conveyor with respect thereto with the end of the secondary conveyor over the corner pan in all operable angular positions of the secondary conveyor, power means having one end thereof connected with the secondary conveyor at a point spaced from the secondary conveyor pivot means and the other end adapted to be anchored, and means mounting the line conveyor for longitudinal shaking movement.

13. A shaking conveyor mechanism as in claim 12 including power means operatively connecting the corner pan and the secondary conveyor at a point spaced from the secondary conveyor pivot to angularly shift the secondary conveyor on the secondary conveyor pivot means.

14. A shaking conveyor mechanism as in claim 12 in which the line conveyor pivot includes a socket on one side of the forward end of the line conveyor and includes a second socket on the other side of the forward end of the line conveyor and the corner pan having a pivot socket angularly disposed from the line conveyor pivot and equidistant from the corner pan pivot as the line conveyor pivot.

15. A shaking conveyor mechanism as in claim 12 including a pivot shifting mechanism connected with the anchorable corner pan pivot comprising a pair of spaced roof jacks, a power means attached between a pivot on one jack and to pivot means on the corner pan pivot, a power means attached between a pivot on the other roof jack and to the pivot means on the corner pan pivot; the line conveyor comprising at least one telescoping pan means including a telescoping pan having an outby end and a cooperating pan receiving the telescoping pan, a first bracket means secured to the outby end of the telescoping pan, a second bracket means secured to the cooperating pan, and conveyor power means operatively connecting the two bracket means to shift the telescoping pan with respect to the cooperating pan.

16. A shaking conveyor mechanism as in claim 15 in which the telescoping pan power means is shorter in length than the telescoping pan including clamping means releasably securing the second bracket means to the cooperating pan.

17. A shaking conveyor mechanism as in claim 16 including pan clamping means carried by the first bracket means to releasably clamp the telescoping pan and the cooperating pan together.

18. A shaking conveyor mechanism as in claim 15 including jack connecting means pivotally secured to the two jacks to maintain the spacing therebetween.

19. A shaking conveyor mechanism as in claim 18 in which the jack connecting means is a power means.

20. A shaking conveyor mechanism comprising a secondary conveyor having a bottom, longitudinal edges and a connecting end, and a secondary conveyor pivot means at the connecting end thereof, a line conveyor having a forward end and a line conveyor pivot means at the forward end; corner pan means providing a conveying connection between the secondary conveyor and the line conveyor including a corner pan, an anchorable corner pan pivot carried by the corner pan and having an axis extending at right angles to the corner pan, means connected with the corner pan pivot to anchor said pivot in position, and adjusting means carried by the corner pan means and mounting the pivot means of one of the conveyors spaced from the corner pan pivot and for adjustment of the conveyor pivot means with respect to the corner pan; and to transmit shaking vibrations to the secondary conveyor, means operatively connecting the pivot means of the other conveyor to the corner pan at a point spaced from the corner pan pivot, and a shaking means connection carried by the line conveyor to which a shaking means is adapted to be connected to vibrate the conveyors longitudinally.

21. A shaking conveyor mechanism as in claim 20 in which the adjusting means includes an arm pivotally mounted on the anchorable pivot for the corner pan, and mounting a conveyor pivot means, and means operatively connecting the corner pan and the arm to adjust the position of the arm and conveyor with respect to the corner pan and to transmit shaking oscillations to the face conveyor.

22. A shaking conveyor mechanism as in claim 20 in which the adjusting means includes a plurality of pivot sockets carried by the corner pan adapted to receive a conveyor pivot.

23. A shaking conveyor mechanism as in claim 20 in which the adjusting means includes a pivot arm mounting a conveyor pivot means, a pair of spaced arm pivots carried by the pivot arm, a pair of power means connected between one pivot and spaced points on the corner pan means adjacent to the corner pan pivot, and a power means connecting with the other arm pivot and the corner pan at a point spaced from the corner pan pivot.

24. A shaking conveyor mechanism comprising a secondary conveyor having a bottom, longitudinal edges including a connecting end; a line conveyor having a forward end; corner pan means providing a conveyor connection between the secondary conveyor and the line conveyor including a corner pan and an anchorable pan pivot carried by the corner pan and having an axis; means connected with the anchorable pan pivot to anchor said pivot in position, line conveyor pivot means pivotally mounting and operatively connecting the forward end of the line conveyor to the corner pan at a point spaced from the anchorable pan pivot, secondary conveyor pivot means pivotally mounting the connecting end of the secondary conveyor over the corner pan at a point spaced from the anchorable pan pivot, power means having one end adapted to be fixed and the other end connected with the secondary conveyor at a point spaced from the secondary pivot means, adjusting means carried by the corner pan means and mounting the secondary conveyor pivot means and secondary conveyor for adjustment of the secondary conveyor pivot means with respect to the corner pan, and means mounting the line conveyor for longitudinal shaking movement to vibrate the conveyors longitudinally.

25. A shaking conveyor means as in claim 19 in which the adjusting means includes a plurality of pivot socket means carried by the corner pan angularly spaced from each other with respect to the anchorable corner pan pivot and adapted to receive a conveyor pivot.

26. A shaking conveyor mechanism as in claim 19 in which the line conveyor pivot includes a pivot socket on one side of the forward end of the line conveyor, a second socket on the other side of the forward end of the line conveyor, and the pivot sockets in the corner pan being spaced radially from the anchorable pivot means.

27. A combination as in claim 19 in which the adjusting means includes a pivot arm pivotally mounted on the anchorable pivot for the corner pan, the secondary conveyor pivot means being mounted on the pivot arm, and a motor connecting the corner pan and the pivot arm, the connections being at points spaced from the anchorable corner pan pivot, the adjusting means serving to adjust the position of the pivot arm and the face conveyor pivot with respect to the corner pan and to transfer shaking motion between the corner pan and the secondary conveyor.

28. A combination as in claim 27 in which the line conveyor pivot means includes a first pivot socket on one side of the forward end of the line conveyor, and including a second pivot socket on the other side of the forward end of the line conveyor, and a second corner pan socket angularly spaced from the first pivot socket, and the pivot sockets in the corner pan being spaced from the anchorable pan pivot.

29. A shaking conveyor mechanism as in claim 24 including a pivot shifting mechanism connected with the anchorable pan pivot comprising a pair of spaced roof jacks, a power means attached between a pivot on one jack and to pivot means on the corner pan pivot, a power means attached between a pivot on the other roof jack and to the pivot means on the corner pan pivot; the line conveyor comprising at least one telescoping pan means including a telescoping pan having an outby end and a cooperating pan receiving the telescoping pan, a first bracket means secured to the outby end of the telescoping pan, a second bracket means secured to the cooperating pan, and conveyor power means operatively connecting the two bracket means to shift the telescoping pan with respect to the cooperating pan.

30. A shaking conveyor mechanism as in claim 29 in which the telescoping pan power means is shorter in length than the telescoping pan including clamping means releasably securing the second bracket means to the cooperating pan.

31. A shaking conveyor mechanism as in claim 30 including pan clamping means carried by the first bracket means to releasably clamp the telescoping pan and the cooperating pan together.

32. A shaking conveyor mechanism as in claim 29 including jack connecting means pivotally secured to the two jacks to maintain the spacing therebetween.

33. A shaking conveyor mechanism as in claim 32 in which the jack connecting means is a power means.

34. A corner pan construction for shaking conveyors comprising corner pan means including a corner pan, an anchorable corner pan pivot carried by the corner pan, and means to anchor the corner pan pivot; a first connecting pivot carried by the corner pan at a point spaced from the anchorable corner pan pivot, conveyor pivot means carried by the corner pan means including a second connecting pivot, a conveyor mounted on the second connecting pivot, and adjusting means carried by the corner pan means and receiving the second connecting pivot to shift the relative position between the parts including the second connecting pivot and the corner pan.

35. A corner pan construction for shaking conveyors as in claim 34 in which the adjusting means includes a plurality of pivot sockets carried by the pan angularly spaced from each other and spaced from the corner pan pivot.

36. A corner pan construction for shaking conveyor as in claim 34 in which the adjusting means includes an arm and an arm pivot pivotally mounting the arm on the corner pan means, and power means connected with the corner pan at a point spaced from the corner pan pivot and connected with the arm at a point spaced from the arm pivot.

37. A corner pan construction for shaking conveyors as in claim 34 in which the arm pivot is the corner pan pivot.

38. A corner pan construction for shaking conveyors as in claim 34 in which the adjusting means includes a pair of power means, one end of each of which is pivotally connected to a single pivot carried by the conveyor pivot means and the other end of each of the pair of power means are anchored at points spaced from each other, and another power means having one end connected with the conveyor pivot means and the other end pivotally attached to the corner pan at a point spaced from the corner pan pivot.

39. An extensible and contractible shaking conveyor section comprising telescoping pan means including a telescoping pan having an inby end and length, and a cooperating pan having length and receiving the telescoping pan; a first bracket means secured to the outby end of the telescoping pan, a second bracket means secured to the cooperating pan, and conveyor power means providing a two directional power transfer connection operatively connecting the two bracket means to extend and contract the telescoping pan means and transmit shaking motions.

40. A conveyor section as in claim 39 in which the conveyor power means has a length less than the length of the pans, and at least one of the bracket means including clamping means for adjustably securing the bracket means to its pan.

41. A conveyor section as in claim 40 including clamping means carried by the other bracket means to clamp the telescoping pan and the cooperating pan together.

42. A shaking conveyor mechanism comprising a secondary conveyor having a bottom, longitudinal edges and a connecting end; a line conveyor having a forward end; corner pan means providing a conveying connection between the secondary conveyor and the line conveyor including a corner pan and a corner pan pivot carried by the corner pan and having a vertical axis; line conveyor pivot means pivotally mounting the end of the line conveyor to the corner pan at a point spaced from the corner pan pivot, means operatively connecting the connecting end of the secondary conveyor with the corner pan means for shaking the secondary conveyor from the pan and pivotally mounting the connecting end of the secondary conveyor including a secondary conveyor pivot means carried by the connecting end of the secondary conveyor and carried by the corner pan means at a point spaced from the corner pan pivot, the end of the secondary conveyor substantially overlapping the corner pan for substantial angular adjustment of the secondary conveyor with respect thereto with the connecting end of the secondary conveyor over the corner pan in all operable angular positions of the secondary conveyor, power means having one end thereof connected with the secondary conveyor at a point spaced from the secondary pivot means and the other end adapted to be anchored, means mounting the line conveyor for longitudinal shaking movement, pivot shifting mechanism connected with the corner pan pivot including a pair of spaced roof jacks, a power means attached between a pivot on one roof jack and pivot means on the corner pan pivot, and a power means attached between the pivot on the other roof jack and the pivot means on the corner pan pivot, and the line conveyor comprising at least one telescoping pan means including a telescoping pan having an outby end and a cooperating pan receiving the telescoping pan, a first bracket means secured to the telescoping pan, a second bracket means secured to the cooperating pan, and conveyor power means operatively connecting the two bracket means to shift the telescoping pan with respect to the cooperating pan and transmit shaking motion therethrough in two directions.

References Cited
UNITED STATES PATENTS

| | | | |
|---|---|---|---|
| 2,661,834 | 12/1953 | Bergman | 198—220.8 |
| 2,670,072 | 2/1954 | Bergman et al. | 198—220.8 |
| 2,920,879 | 1/1960 | Driehaus | 299—75 X |
| 1,143,599 | 6/1915 | Hess | 262—36 |
| 2,805,758 | 9/1957 | Madeiro et al. | 198—82 |

ERNEST R. PURSER, *Primary Examiner.*

B. HERSH, *Assistant Examiner.*